US012743519B2

(12) United States Patent
Samuel et al.

(10) Patent No.: US 12,743,519 B2
(45) Date of Patent: Sep. 22, 2026

(54) OFFLOADING WORKLOADS TO A TRUSTED DOCK

(71) Applicant: DELL PRODUCTS, LP, Round Rock, TX (US)

(72) Inventors: Balasingh Samuel, Round Rock, TX (US); Jacob Mink, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 26 days.

(21) Appl. No.: 18/919,599

(22) Filed: Oct. 18, 2024

(65) Prior Publication Data

US 2026/0111552 A1 Apr. 23, 2026

(51) Int. Cl.
*G06F 21/00* (2013.01)
*G06F 9/50* (2006.01)
*G06F 21/57* (2013.01)

(52) U.S. Cl.
CPC ............ *G06F 21/572* (2013.01); *G06F 9/505* (2013.01); *G06F 2221/034* (2013.01)

(58) Field of Classification Search
CPC .. G06F 21/572; G06F 9/505; G06F 2221/034; G06F 21/577; G06F 1/1632; G06F 21/44; G06F 16/2255
See application file for complete search history.

(56) References Cited

U.S. PATENT DOCUMENTS

2013/0185564 A1 7/2013 Jaber et al.
2018/0075241 A1* 3/2018 Gomez ..................... G06F 8/63
2019/0281449 A1* 9/2019 Luo ................... H04W 12/0431
2020/0259805 A1* 8/2020 Grobelny ................ G06F 21/85
2022/0171851 A1* 6/2022 Tsirkin .................. G06F 21/577
2022/0255372 A1* 8/2022 Nord ..................... G06F 1/1632
2023/0317193 A1* 10/2023 Alzheimer ....... G11C 29/12005
2024/0236056 A1 7/2024 Goodman

* cited by examiner

*Primary Examiner* — Yogesh Paliwal
(74) *Attorney, Agent, or Firm* — Larson Newman, LLP

(57) ABSTRACT

An information handling system that includes a processor and a memory coupled to the processor. The information handling system may retrieve dock information in response to detecting a connection between an information handling system and a docking station. The information handling system may also transmit a first request for a dock firmware based on the dock information of the docking station subsequent to the detecting of the connection between the information handling system and the docking station. In addition, the information handling system may transmit a second request to the docking station to read a firmware block associated with the dock firmware received in response to the first request. Further, the information handling system may generate a hash based on the firmware block received in response to the second request and verify the hash by comparing the hash with a hash value included in the dock firmware.

20 Claims, 6 Drawing Sheets

100
Application 102
Application 104
Data Storage 108
AI workload Orchestrator 110
Device Selection Service 112
AI Workload 115
Control Plane 106
Policy Management Service 114
Authentication Service 117
Firmware Management Service 116
Monitoring Services 118
Performance Monitor 120
Security Monitor 122
Power Monitor 124
Acoustics Monitor 126
Location Monitor 128
Thermal Monitor 130
Reliability Monitor 132
Monitor 134
Device 105
Trusted Dock Catalog and Hash Table 193
Application 190
Application 192
IT Policy 182
Cloud Workload Orchestrator 184
ITDM Portal 186
Workspace Reservation Data Store 188
Cloud Gateway Services 175
Dock 196
Device 194

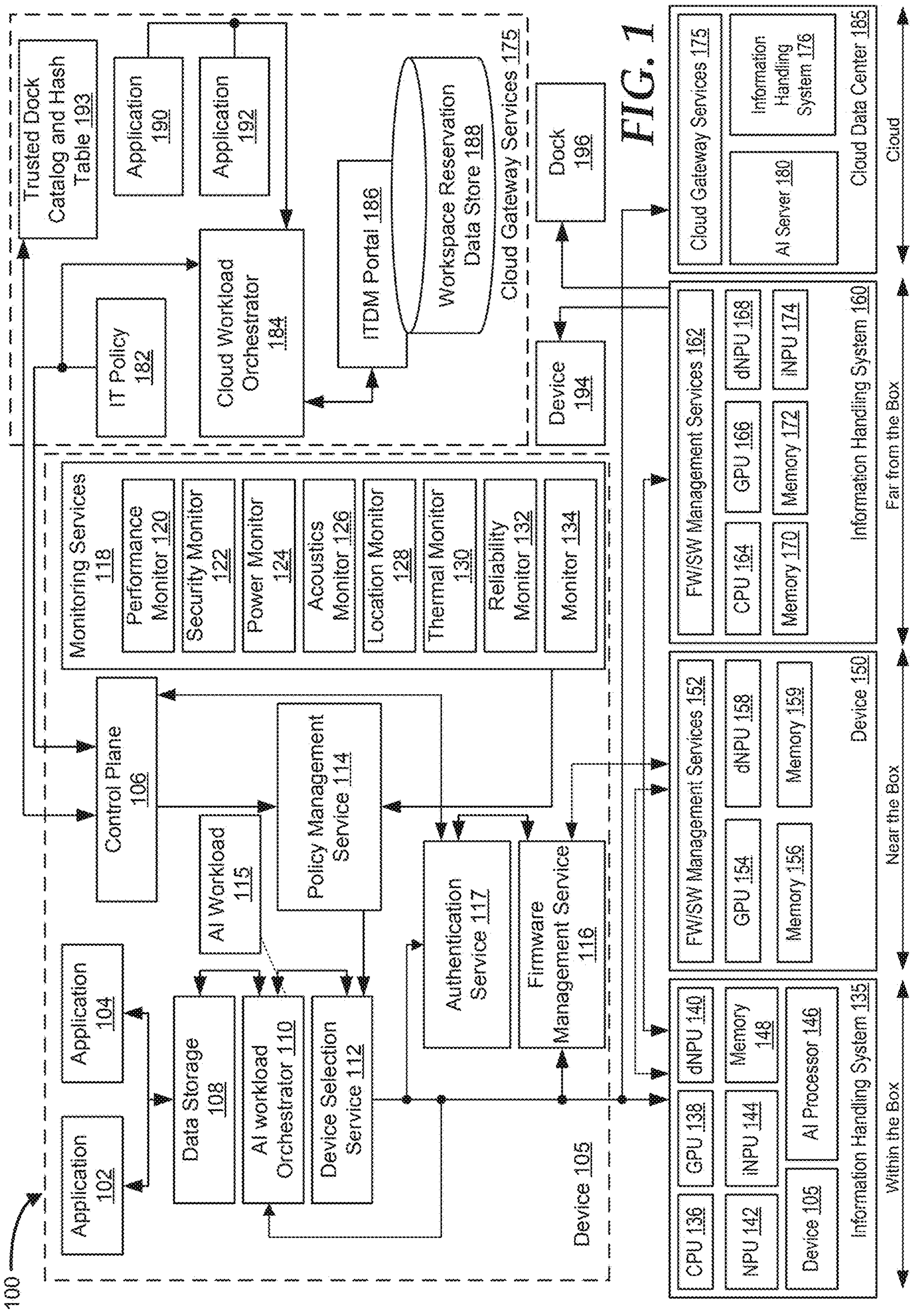

FIG. 1
CPU 136
GPU 138
dNPU 140
NPU 142
iNPU 144
Memory 148
Device 105
AI Processor 146
Information Handling System 135
Within the Box
FW/SW Management Services 152
GPU 154
dNPU 158
Memory 156
Memory 159
Device 150
Near the Box
FW/SW Management Services 162
CPU 164
GPU 166
dNPU 168
Memory 170
Memory 172
iNPU 174
Information Handling System 160
Far from the Box
Cloud Gateway Services 175
AI Server 180
Information Handling System 176
Cloud Data Center 185
Cloud

200-A

240

| Dock Identifier 205 | Firmware Version 210 | Table Index 215 |
|---|---|---|
| 0x3291 | 1.00 | 3 |
| 0x9876 | 1.00 | 1 |
| 0x0129 | 1.00 | 5 |
| 0x3291 | 1.10 | 2 |
| 0xABCD | x.y | n |

| Table Index 215 | Firmware Block Index 220 | Starting Address 225 | Size 230 | Hash 235 |
|---|---|---|---|---|
| 1 | 1 | 0xC000 | 4K | Hash-1 |
| | 2 | 9xF000 | 2K | Hash-2 |
| | 3 | 0xA000 | 2K | Hash-3 |
| | 4 | 0x9000 | 4K | Hash-4 |
| | n | 0x2000 | 8K | Hash-n |
| 2 | 1 | 0xC000 | 4K | Hash-1 |
| | 2 | 9xF000 | 2K | Hash-2 |
| | 3 | 0xA000 | 2K | Hash-3 |
| | 4 | 0x9000 | 4K | Hash-4 |
| | n | 0x2000 | 8K | Hash-n |
| 3 | 1 | 0xC000 | 4K | Hash-1 |
| | 2 | 9xF000 | 2K | Hash-2 |
| | 3 | 0xA000 | 2K | Hash-3 |
| | 4 | 0x9000 | 4K | Hash-4 |
| | n | 0x2000 | 8K | Hash-n |

*FIG. 2B*

Information Handling System

602 Processor

604 Processor

634 Video Display

620 Memory

622

610 Chipset

606

608

632

630 Graphics Interface

636

612

640 NVRAM

642 BIOS/EFI

670 I/O Interface

650 Disk Controller

692

672

656 ODD

652

676 TPM

680 Network Interface

674 Add-On Resource

654 HDD

690 BMC

682

660 Disk Emulator

694

664 Solid State Drive

662

OFFLOADING WORKLOADS TO A TRUSTED DOCK

FIELD OF THE DISCLOSURE

The present disclosure generally relates to information handling systems, and more particularly relates to offloading workloads to a trusted dock.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may retrieve dock information in response to detecting a connection with a docking station. The information handling system may also transmit a first request for dock firmware based on the dock information. The information handling system may transmit a second request to the docking station to read a firmware block associated with the dock firmware, generate a hash based on the firmware block, and verify the hash by comparing the hash with a hash value included in the dock firmware.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 1 is a block diagram of a distributed system of information handling systems for offloading workloads to a trusted dock, according to an embodiment of the present disclosure;

FIG. 2A is a diagram of a portion of a trusted dock catalog, according to an embodiment of the present disclosure;

FIG. 2B is a diagram of a portion of a trusted dock hash table, according to an embodiment of the present disclosure;

The use of the same reference symbols in different drawings indicates similar or identical items.

DETAILED DESCRIPTION OF THE DRAWINGS

Figure 3:
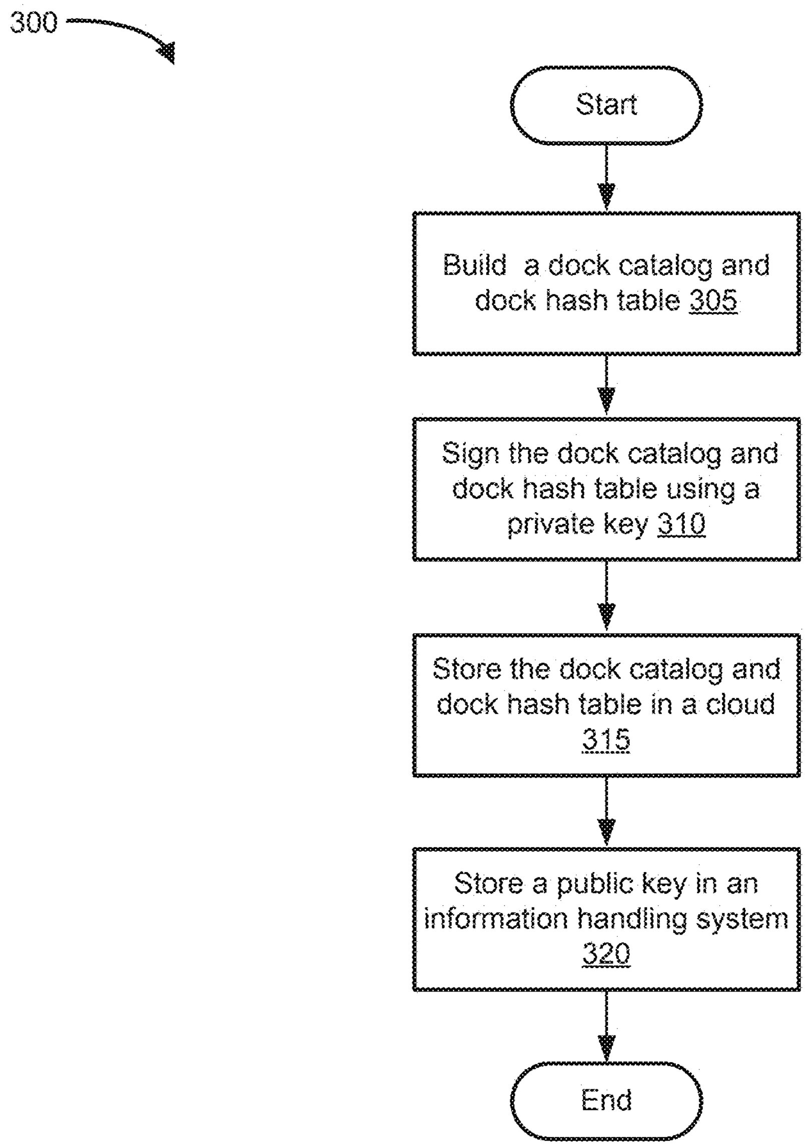
FIG. 3 is a flow chart of a method for offloading workloads to a trusted dock, according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

In a distributed computing environment, a user's workload may execute locally on the user's information handling system or remotely, such as on a connected computing device. One of the key opportunities for improving user experience is workload latency. When a user is working on their computer, the latency of the workload, such as an AI workload may be too high to feasibly run the workload locally. If the user is connected to a local external computer or computing device, that may be the next best place to run the workload. However, this comes with tradeoffs like data security, for secure data integrity with data operations. To address this and other issues, the present disclosure provides for a system and method to pre-provision and/or pre-authorize an information handling system or computing device, such that the information handling system or computing device can be trusted to execute an offloaded workload.

FIG. 1 illustrates a portion of a distributed system environment 100 for workspace-aware pre-emptive artificial intelligence workload provisioning, according to an embodiment of the present disclosure. Distributed system environment 100 includes a set of communicatively coupled information handling systems or compute devices, such as information handling systems 135 and 160, a device 150, and a cloud data center 185. Local and remote information handling systems in distributed system environment 100 may be communicatively linked either by hardwired data links, wireless data links, or a combination of hardwired and wireless data links through a network.

The network may be a public network, such as the Internet, a physical private network, a wireless network, a virtual private network, or any combination thereof. The network may be implemented as or may be implemented as or may be a part of, a storage area network, a personal area network, a local area network, a metropolitan area network, a wide area network, a wireless local area network, an intranet, or any other appropriate architecture or system that facilitates the communication of signals, data, and/or messages.

Information handling systems generally process, compile, store, and/or communicate information or data for business, personal, or other purposes thereby allowing users to take advantage of the value of the information. Nevertheless, a continually growing number of information handling systems and devices are being enhanced with AI services, such as heuristic learning, machine learning, deep learning, reinforcement learning services, and the like. Currently, most AI services are performed in central processing units (CPUs), graphics processing units (GPUs), system on chips (SOCs), neural processing units (NPUs), or other processors of the information handling system.

As the number of AI services increases, so will the need for computing resources to execute machine learning or AI models. Nevertheless, executing AI services in the information handling system, such as on-the-box (OTB) can inadvertently affect end-user productivity and negatively exhibit adverse effects, such as reduced battery life, system performance, and overall end-user experience. Conventional techniques to address this problem include AI hardware accelerators and AI software accelerators. However, these accelerators can be busy performing other tasks. In addition, these accelerators can be expensive and thus may not get integrated into low-cost platforms. Accordingly, embodiments of the present disclosure provide a system and method for preemptive and secure transitioning of AI workload to a premium information handling system, such as a dock using workspace reservation information.

Figure 6:
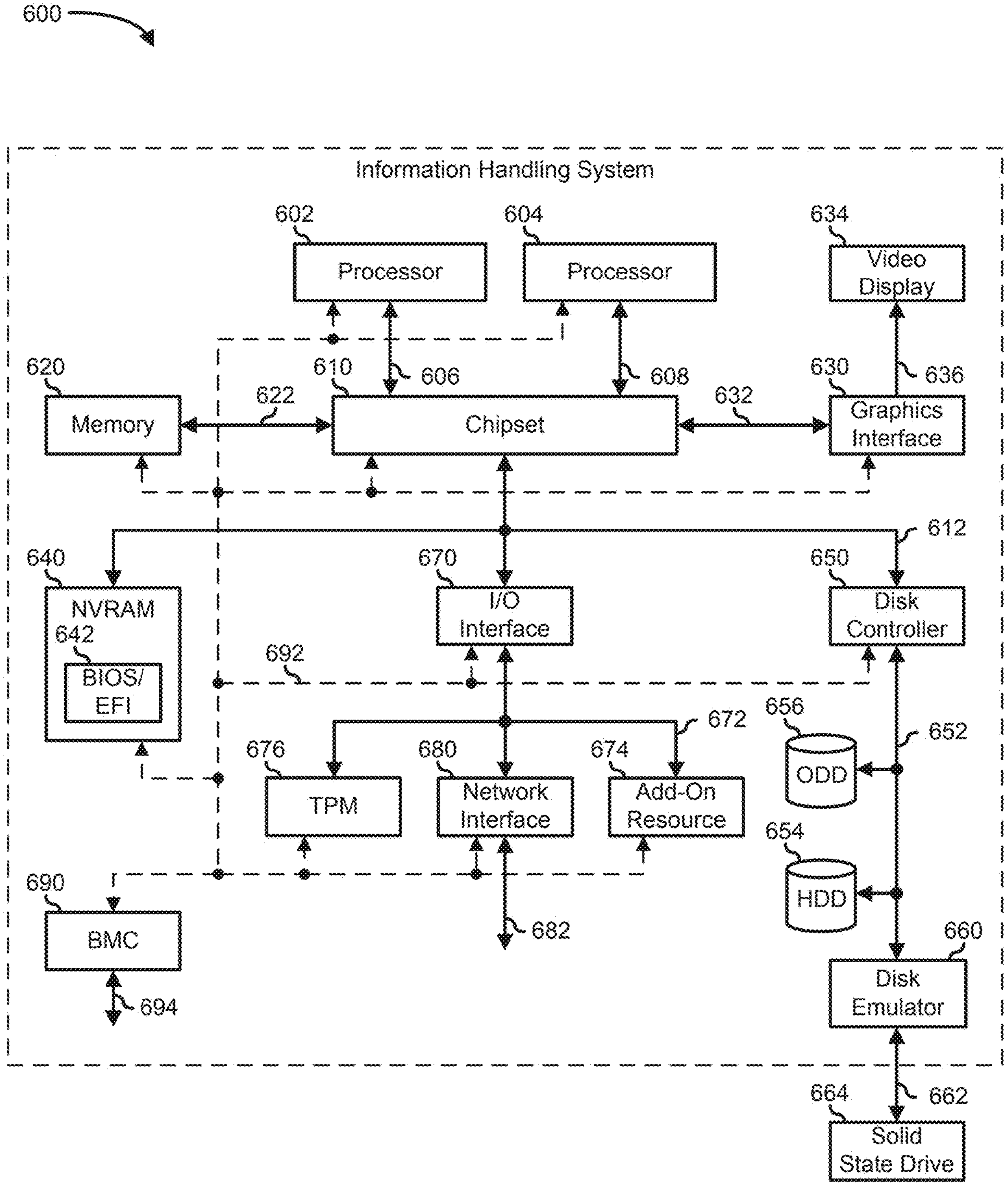
FIG. 6 is a block diagram of an information handling system, according to an embodiment of the present disclosure.

Information handling system 135, which is similar to information handling system 600 of FIG. 6 may be a personal computer, a desktop computer system, a laptop computer system, a server computer system, a mobile device, a tablet computing device, a personal digital assistant, a consumer electronic device, an electronic music player, an electronic camera, an electronic video player, a wireless access point, a network storage device, or any other suitable computing device. Distributed system environment 100 may also be a portable information handling system that may include a laptop, a notebook, a smartphone, a tablet, or a personal digital assistant, among others. In one example, information handling system 135 may be a client computer, such as an employee's corporate laptop that he or she docks into device 150 upon arrival at a cubicle.

Information handling system 135 may be communicatively coupled to device 150 and information handling system 160. Information handling system 135 may also be communicatively coupled to cloud data center 185 via the Internet. In one example, information handling system 160 is communicatively coupled with a device 194 and a dock 196. Device 194 may be similar to device 105 while dock 196 may be similar to device 150. However, any variety of connections between various components of distributed system environment 100, such as connections between information handling systems 135 and 160, devices 105 and 194, and dock 196 with cloud data center 185 are envisioned as falling within the scope of the present disclosure. In addition, connections between components and within the various components of distributed system environment 100 are also envisioned as falling within the scope of the present disclosure. In addition, connections between components and within the various components may be omitted for descriptive clarity.

Information handling system 135 includes a device 105, a CPU 136, a GPU 138, a discrete NPU (dNPU) 140, an NPU 142, an integrated NPU (INPU) 144, an AI processor 146, and a memory 148. Device 105 includes applications 102 and 104, a control plane 106, a data storage 108, an artificial intelligence (AI) workload orchestrator 110, a device selection service 112, a policy management service 114, a firmware management service 116, and a monitoring service 118.

CPU 136, which is similar to processors 602 and 604 of FIG. 6, may be configured to execute instructions of an application, such as applications 102 and 104. CPU 136 may also be configured to execute instructions associated with AI workload orchestrator 110, device selection service 112, policy management service 114, and firmware management service 116. In addition, CPU 136 along with GPU 138, dNPU 140, NPU 142, INPU 144, and AI processor 146 may be configured to execute an AI workload, such as AI workload 115.

GPU 138, which may be similar to a graphics adapter 630 of FIG. 6 may comprise any system, device, or apparatus configured to process graphical or visual content and to communicate that content to a monitor or display where the content may be rendered. An NPU may comprise any system, device, or apparatus, such as a hardware accelerator that is designed for AI and ML tasks. NPUs are optimized to handle the complex computations required by deep learning algorithms. This optimization makes NPUs efficient at processing AI tasks, such as natural language processing, image analysis, and more. NPUs utilized by information handling system 135 may be of various types including dNPU 158, INPU 144, and AI processor 146. DNPU may be a discrete NPU, such as an NPU in a USB stick. An NPU may also be integrated with information handling system 135. INPU 144 may be connected via an m.2 slot within information handling system 135. AI processor 146 may comprise any system, device, or apparatus configured to process AI workloads.

Memory 148, which is similar to a memory 620 of FIG. 6, may comprise a non-volatile memory accessible by CPU 136, GPU 138, dNPU 140, NPU 142, INPU 144, device 105, or AI processor 146. However, each one of the aforementioned may be associated with a separate non-volatile memory device. Memory 148 may include a static random access memory (SRAM), a dynamic random access memory (DRAM), or any suitable device to support high-speed memory operations. In certain embodiments, memory 148 may combine both persistent, non-volatile memory and volatile memory. In certain embodiments, memory 148 may include multiple removable memory modules.

Device 105 may comprise any system, device, or apparatus configured to host control plane 106, data storage 108, AI workload orchestrator 110, device selection service 112, policy management service 114, firmware management service 116, an authentication service 117, and applications 102 and 104. Applications 102 and 104 are applications installed locally on device 105, also referred to as on-the-box (OTB) applications. For example, application 102 may be a video telephony software program while application 104 may be a natural language processing application.

Control plane 106 may be configured to control or route data received from cloud gateway services 175 to one or more components of information handling system 135, such as policy management service 114. In one example, control plane 106 may route IT policy 182 to device selection service 112. Data storage 108 may be a persistent data storage device. Data storage 108 may include solid-state disks, hard disk drives, magnetic tape libraries, optical disk drives, magneto-optical disk drives, compact disk drives, compact disk arrays, disk array controllers, and/or any computer-readable medium operable to store data. Data storage 108 may include a database or a collection of files that is a central repository of data associated with workloads that are accessible by AI workload orchestrator 110 and applications 102 and 104. For example, AI workload orchestrator 110 and applications 102 and 104 may retrieve, store, and utilize data stored in data storage 108.

AI workload orchestrator 110 may be configured to monitor, control, and/or manage AI workloads instantiated using a CPU, GPU, NPU, or similar, such as AI workload 115. AI workload 115 generally refers to data associated with an AI service that is to be performed to generate one or more inferences based on the data. For example, AI workload 115 may include a set of input data, such as telemetry data, past profile recommendations, machine learning hints from other AI services, etc., that may be processed to generate one or more inferences. As such, AI workload 115 may include machine learning and deep learning workloads, such as tasks performed by AI systems which typically involve processing large amounts of data and performing complex computations.

For example, a typical machine learning workflow may include building a model from a sample dataset, evaluating the model against one or more additional sample datasets to decide whether to keep the model and to benchmark how good the model is, using the model in production to make predictions or decisions against live input data captured by an application. The training set, validation set, and/or test set can respectively include pairs of input datasets and output datasets that correspond to the respective input datasets.

Device selection service 112 may comprise any system, device, or apparatus configured to determine a physical and/or virtual device or information handling system to process or transition an AI workload according to a policy, such as IT policy 182. For example, device selection service 112 may determine whether to transition AI workload 115 to a trusted device or information handling system within distributed system environment 100 that includes an AI processor capable of executing an AI workload. An AI processor includes a GPU, CPU, NPU, dNPU, INPU, or similar that is capable of executing an AI workload. Typically, an OTB AI processor is prioritized over a "near the box" device or information handling system. However, the "near the box" device or information handling system is generally prioritized over a "far from the box" device or information handling system. Accordingly, the "far from the box" AI processor or information handling system is generally prioritized over a cloud resource.

Device selection service 112 and/or AI workload orchestrator 110 may gather data or information from monitoring services 118 or its components. The data or information may include current performance, power utilization, and acoustic and thermal levels, among others to characterize the current state or utilization of one or more components of information handling system 135. This information may be utilized to determine whether to offload AI workloads according to policy, such as IT policy 182 provided by policy management service 114. Policy management service 114 may comprise any system, device, or apparatus configured to manage, monitor, and/or control IT policies, such as policies associated with AI workload transitions.

Firmware management service 116 may comprise any system, device, or apparatus configured to communicate with relevant hardware post-device selection. For example, firmware management service 116 may interface with a specific vendor application programming interface (API) to an OTB hardware, to a hardware connected to information handling system 135, or it may pass through to external components in order to run the workload.

Authentication service 117 may comprise any system, device, or apparatus configured to verify if a connected dock, such as device 150 is pre-authorized to execute a workload, such as AI workload 115. The verification and/or pre-authorization may be used to establish trust between information handling system 135 and device 150. The establishment of trust relates to software processes and/or hardware devices that ensure that firmware and other software executing the workload are operating as expected. One aspect of the establishment of trust is to ensure that the firmware and/or software of the device or dock to be trusted, such as device 150, is what the manufacturer intended before the workload is executed.

In one embodiment, authentication service 117 may be configured to communicate with a trusted dock catalog and hash table 193 during the pre-authorization to validate or authenticate a firmware block stored at a memory associated with a computing device, peripheral device, or dock to be trusted. If the authentication and/or authorization of the connected computing device, peripheral device, or dock are successful, then device selection service 112 may be able to select the dock, such as device 150 as an execution unit for workloads, such as AI workload 115. In one embodiment, authentication service 117 may be executed by a processor. As such, the process of authentication and/or authorization may be performed by a system-embedded controller firmware using a sideband channel. Although operations depicted herein are based on pre-provisioning and pre-authorization of device 150. One of skill in the art will appreciate that the operations may be applicable to another docking station, such as dock 196.

Monitoring services 118 may be configured to monitor, control, and/or manage one or more features of information handling system 135 and/or device 105, such as the health and performance of device 105. As such, monitoring service 118 includes one or more monitoring services, wherein each monitoring service may monitor, control, and/or manage a feature of device 105. For example, monitoring service 118 includes a performance monitor 120, a security monitor 122, a power monitor 124, an acoustics monitor 126, a location monitor 128, a thermal monitor 130, a reliability monitor 132, and monitor 134. Monitoring services 118 can include other monitors or monitoring services than depicted herein as new information becomes available to information handling system 135 and/or monitoring services 118.

Performance monitor 120 may be configured to monitor, manage, and/or control the performance of device 105 and/or its components. For example, performance monitor 120 can collect performance metrics over time, at specified intervals, and generate logs that can be analyzed to identify system performance issues. Security monitor 122 may be configured to monitor, manage, and/or control security of device 105 and/or its components. For example, security monitor 122 can detect a security data threat with data associated with AI workload. Power monitor 124 may be configured to monitor, manage, and/or control power consumption of device 105 and/or its components. For example, power monitor 124 may determine the power consumption of each one of applications 102 and 104. Acoustics monitor 126 may be configured to monitor, manage, and/or control the acoustics level of device 105 and/or its components. For example, acoustics monitor 126 may provide a current acoustics level to performance monitor 120.

Location monitor 128 may comprise any system, device, or apparatus configured to determine the location and movement of information handling system 135, such as based on triangulation of network information or information accessible via the operating system, or a location subsystem, such as a global positioning system (GPS) module. Thermal monitor 130 may be configured to monitor, manage, and/or control thermal level of device 105 and/or its components. For example, thermal monitor 130 may receive temperature information from one or more temperature sensors. In addition, thermal monitor 130 may provide a current thermal level to performance monitor 120.

Reliability monitor 132 may comprise any system, device, or apparatus configured to monitor, manage, and/or control hardware or software issues that may affect the performance and reliability of information handling system 135. Monitor 134 may comprise any system, device, or apparatus configured to determine other information to be utilized by monitoring services 118 during the monitoring, managing, and/or controlling information handling system 135 and/or its components. For example, monitor 134 may be configured to support proximity sensors, including optical, infrared, and/or sonar sensors, which may be configured to provide an indication of a user's presence near information handling system 135, absence from information handling system 135, and/or distance from information handling system 135, such as near-field, mid-field, or far-field.

In general, computer networks are considered to be trusted according to the following rules: a. by default, provisioned information handling systems under the purview of an organization's information technology (IT) department are trusted by each other for many corporate information handling system users, and b. by default multiple systems registered with the same account are considered to be trusted for non-corporate users. IT administrators have the ability to create smaller groups within their organization, such as engineering laptops workstations, desktop computers, and based on the organization's policy on potential data sharing. Additionally, AI workload processes may consume a relatively large amount of processing resources, yet the results they provide often do not require instantaneous implementation, such as other process-intensive services. On certain conditions and based on the local resources, it could otherwise be better to send the data to another device or a trusted information handling system within an organization group with the capability to perform AI workloads, such as devices with "premium" AI capabilities like device 150. A premium device may include a dock, an M.2 connected NPU, a webcam, or similar that includes an AI processor.

Device 150 may be referred to as a "premium" device with AI processing capabilities that can be utilized to process an AI workload, such as a firmware/software (FW/SW) service 152, a GPU 154, a dNPU 158, and memories 156 and 159. Device 150 may be a dock, also referred to as a docking station, wherein information handling system 135 can be connected, such as via a wired connection or a short-range wireless connection like Bluetooth®. Wi-Fi®, NearLink®, near-field communication (NFC), low-power wide-area network, ultra-wideband, Institutes of Electrical and Electronics Engineers (IEEE) 802.15, or similar. As such, device 150 may be a trusted device and classified as a "near the box" system relative to information handling system 135. In addition, physical devices or peripherals that are plugged in or associated with device 150 or other information handling systems that are physically or wirelessly connected to information handling system 135 via a short-range wireless connection may also be classified as "near the box" devices or information handling systems. This includes a webcam, keyboard, monitor, or other devices that are connected to information handling system 135 and/or device 150.

FW/SW management service 152 may comprise any system, device, or apparatus configured to communicate with the relevant information handling system post-selection. For example, FW/SW management service 152 may interface with a device, component, or information handling system that will be leveraged on the device itself in order to run the AI workload. Accordingly, FW/SW management service 152 may be configured to receive an AI workload, run the AI workload locally, and then return the result to the source or display the result to the user. For example, FW/SW management service 152 may communicate via APIs to another information handling system, component, device, or to a cloud workload orchestrator, such as cloud workload orchestrator 184. In another example, FW/SW management service 152 may communicate with AI workload orchestrator 110.

GPU 154, which is similar to GPU 138, may comprise any system, device, or apparatus configured to process graphical or visual content and to communicate that content to a monitor or display where the content may be rendered. DNPU 158 may be similar to dNPU 140. Device 150 may include other AI processing units, also referred to as AI processors, similar to NPU 142, INPU 144, and AI processor 146. Memories 156 and 159 may be similar to memory 148. In one embodiment, memory 156 may be accessible by GPU 154 while memory 159 may be accessible by dNPU 158. However, GPU 154 and dNPU 158 may also be configured to share one memory.

Information handling system 160 can be a physical or virtual computing device that includes an FW/SW management service 152, a CPU 164, a GPU 166, a dNPU 168, and memories 170 and 172. In one example, information handling system 160 may operate as a server or as a peer computer system. Information handling system 160 may also be coupled to device 194 and dock 196, which is similar to device 105 and device 150 respectively. In one embodiment, distributed system environment 100 may include a trusted workgroup that is configured in a trusted peer network. The trusted workgroup may include information handling systems 135 and 160, and device 150, wherein these information handling systems and devices may be configured with AI services. As such, information handling system 160 may be a "trusted peer" of information handling system 135. Thus, information handling system 160 may be available to share AI workload 115 similar to device 150.

In this example, information handling system 160 may be deployed within a communication network but farther from information handling system 135 than device 150. For example, information handling systems 135 and 160 may be configured within a local area network. As such, information handling system 160 may be referred to as a "far from the box" system relative to information handling system 135. Accordingly, a computing device or information handling system that is configured within a local network similar to information handling system 160 may be deemed as far from the box relative to information handling system 135. For example, device 194 and dock 196 may also be deemed as far from the box.

FW/SW management service 162 may comprise any system, device, or apparatus configured with functionality that is similar to FW/SW management service 152. CPU 164 may comprise any system, device, or apparatus configured with functionality that is similar to CPU 136. GPU 166 may comprise any system, device, or apparatus configured with functionality that is similar to GPU 138. DNPU 168 may comprise any system, device, or apparatus configured with functionality that is similar to dNPU 140. INPU 174 may comprise any system, device, or apparatus configured with functionality that is similar to iNPU 144. Memories 170 and 172 may be configured similar to memory 148. In this example, memory 170 may be accessible by CPU 164 while memory 172 may be accessible by GPU 166. However, information handling system 160 may have more or less memories than shown. For example, information handling system 160 may have one memory that is accessible by CPU 164, GPU 166, dNPU 168, and iNPU 174.

Cloud data center 185 includes cloud gateway services 175, an information handling system 176, and an AI server 180. Cloud data center 185 may also include one or more racks that house information handling systems. In addition, other cloud data centers aside from cloud data center 185 may also be included as part of the cloud. In another embodiment, cloud gateway services 175 may be hosted by information handling system 176 or AI server 180. One or both of information handling system 176 and AI server 180 may be a physical or a virtual computing device. Cloud gateway services 175 includes a cloud workload orchestrator 184, an ITDM portal 186, a workspace reservation data store 188, IT policy 182, a trusted dock catalog and hash table 193, and applications 190 and 192. Applications 190 and 192 are applications installed remotely on cloud gateway service 175, also referred to as on-the-cloud (OTC) applications. These applications may be discrete application entities, or they may work in conjunction with OTB applications of information handling systems within the network, such as applications 102 and 104.

Cloud workload orchestrator 184 may comprise any system, device, or apparatus configured to run an AI workload on an available cloud computer, which can be in a private cloud, or a cloud computing platform based on an IT policy. ITDM portal 186 may comprise any system, device, or apparatus configured to allow an ITDM or a user to set policy on distributed system environment 100 as a whole, a set of information handling systems, or an individual information handling system. ITDM portal 186 also allows the ITDM to participate in the allocation of the information handling systems or resources in distributed system environment 100. In addition, ITDM portal 186 further allows the ITDM, user, or cloud workload orchestrator 184 to look up forthcoming workspace reservations and decide where a machine learning model, a deep learning model, an AI workload, or similar should be run.

Workspace reservation data store 188 may comprise any system, device, or apparatus configured to allow cloud gateway services 175 to store and retrieve data, such as workspace reservations. In one embodiment, workspace reservation data store 188 may be similar to data storage 108. For example, workspace reservation data store 188 may include a magnetic hard disk storage drive or a solid-state storage drive. In certain embodiments, workspace reservation data store 188 may be a cloud system of storage devices that is accessible via network. Further workspace reservation data store 188 may include a database or a collection of files that is a central repository of data associated with workspace reservations that are accessible by cloud workload orchestrator 184, ITDM portal 186, and/or applications 190 and 192. For example, cloud workload orchestrator 184 may retrieve, store, and utilize data stored in workspace reservation data store 188 via ITDM portal 186.

In modern enterprises, the term "hoteling," shared workspaces, or co-working spaces collectively refer to physical environments where clients, users, or employees can schedule their hourly, daily, or weekly use of individual spaces, such as office desks, cubicles, or conference rooms, thus serving as an alternative to conventional, permanently assigned seating. In some cases, hoteling clients, users, or employees access a reservation system to book an individual space, such as a desk, a cubicle, a conference room, an office, etc. before they arrive at work, which gives them the freedom and flexibility to work wherever they want to. Each workspace may include its own set of peripheral devices or components, such as displays, webcams, microphones, speakers, headsets, printers, etc. When a client, user, or employee reaches the workspace, they typically bring their individual information handling system, connect their information handling system to a dock or docking station, and integrate with the set of peripheral devices or components.

Shared workspaces and computer equipment can be preconfigured based on location or utility. In today's work from home environment, employees infrequently visit office buildings. Cubicles, desks, and their accompanying computer equipment are thus shared by different employees in a hoteling arrangement. An employee can typically reserve a workspace using a portal online to select the workspace based on various factors, such as building, team locality, hardware, and length of time for usage. An example of a workspace reservation is shown below:

```
{
  "User": "FirstName_LastName",
  "Start_Time": "2024/08/30 13:00:00 -05:00"
  "End_Time": "2024/08/30 18:00:00 -5:00"
  "Country": "United States",
  "State": "Texas",
  "City": "Austin",
  "Office_Code": "12345-3-1"
  "Workspace_Code": "PS3-2-134-1"
}
```

When the employee arrives at the cubicle, desk, or other workspace, the employee's smartphone and laptop computer may be provisioned via wired or wireless network, such as WI-FI®, BLUETOOTH®, and other wireless networks serving the workspace. For example, provisioning may include FW/SW management services 152 determining whether there is an upcoming workspace reservation and whether there is an AI workload to be processed associated with the workspace reservation. The processing of the AI workload can also be triggered when the employee logs in. The devices or information handling system associated with the workspace reservation may also be pre-provisioned prior to the employee logging in. As such, the AI workload can be processed before the employee logs in. This enables optimization of the AI workload offload procedure.

IT policy 182 may comprise an IT policy or a set of IT policies that may indicate whether a given AI workload is eligible for migration, for example, based upon contextual information indicative of a level of processing required for that workload (e.g., whether an offload allowed or not allowed based upon AI processing capability, location requirement, security requirement, etc.). In one example, IT policy 182 may be a global IT policy as shown below:

```
{
  "IncludeCompute": ["CPU", "GPU", "NPU"],
  "VideoWorkloads": "Disabled",
  "AudioWorkloads": "Enabled",
```

-continued

```
        "ExcludeDevicePattern": "Intel ® iGPU*"
    }
```

The above policy may enable the use of CPU, GPU, and NPU on the information handling systems included in distributed system environment 100 that the ITDM manages, such as information handling system 135 and 160, and device 150. According to this policy, video workloads would be disabled on the information handling systems and devices. However, this policy allows audio workloads. In this example, the IT policy would limit the use of the CPU, GPU, and NPU to clean up a meeting video but would allow the use of the CPU, GPU, and NPU to participate in cleaning up audio associated with the meeting.

In general, computer networks are considered to be trusted according to some rules, such as: a. by default, provisioned information handling systems under the purview of an organization's information technology (IT) department are trusted by each other for many corporate information handling system users, and b. by default, multiple systems registered with the same account are considered to be trusted for non-corporate users. IT administrators have the ability to create smaller groups within their organization, such as engineering computing devices, workstations, etc. to trust other engineering computing devices or workstations, according to the organization's policy. For example, IT policy 182 may be configured as an engineering system group policy for a specific set or group of information handling systems as shown below:

```
{
  "LocalWorkloads": {
    "Never": {
      "ApplicationList": ["Visual Studio", "Creo"]
    },
    "NPUAvailable": {
      "ApplicationList": ["Teams ®", "Zoom ®", "VSCode ®"]
    }
  }
}
```

The above policy may apply to a set or group of information handling systems in an engineering domain that an ITDM manages. This policy may be configured to control when an AI workload can be run locally in one or more information handling systems in the engineering domain. In this example, local AI workloads may not be run locally if an end user is running a Visual Studio® or Creo® application. On the other hand, if the end-user is running Teams®, Zoom®, or VSCode®, then local AI workloads may run when there is a local NPU available.

Trusted dock catalog and hash table 193 includes a trusted dock catalog as depicted in FIG. 2A and a dock hash table as depicted in FIG. 2B. Trusted dock catalog and hash table 193 may be securely stored in a data store of cloud data center 185. Entries in trusted dock catalog and hash table 193 may be updated by an IT administrator when a new dock and a new dock firmware version are added to distributed system environment 100. When a dock is decommissioned, the dock and its associated firmware version may be deleted from trusted dock catalog and hash table 193. Trusted dock catalog and hash table 193 may initially be built statically at a build server associated with cloud data center 185 using a private key. A public key associated with the private key may be provisioned in the system-embedded controller firmware.

In various embodiments, distributed system environment 100 may not include each of the components shown in FIG. 1. Additionally, or alternatively, distributed system environment 100 may include various additional components to those shown in FIG. 1. Furthermore, some components that are represented as separate components in FIG. 1 may in certain embodiments be integrated with other components. For example, in certain embodiments, all or a portion of the illustrated components may instead be provided by components integrated into one or more processors, such as a SOC.

Those of ordinary skill in the art will appreciate that the configuration, hardware, and/or software components of distributed system environment 100 depicted in FIG. 1 may vary. For example, the illustrative components within distributed system environment 100 are not intended to be exhaustive but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

FIG. 2A illustrates a portion of a trusted dock catalog 200-A, according to an embodiment of the present disclosure. In one embodiment, trusted dock catalog 200-A may include information associated with docks that are in distributed system environment 100 of FIG. 1. Accordingly, trusted dock catalog 200-A may be created and/or maintained by an ITDM associated with distributed system environment 100 of FIG. 1. As such, trusted dock catalog 200-A may include dock information associated with unique dock type and firmware version combination in the distributed system environment. Thus, trusted dock catalog 200-A may be used to block untrusted docks. However, each dock can be differentiated by adding a serial number of the dock in trusted dock catalog 200-A. Further, trusted dock catalog 200-A may be updated each time a new firmware version is released.

In another embodiment, trusted dock catalog 200-A may include information associated with docks manufactured and/or sold by a particular original equipment manufacturer (OEM) or vendor, respectively. Accordingly, trusted dock catalog 200-A may be created and/or maintained by the OEM and includes unique dock type and firmware version combinations that are supported by the OEM. Thus, trusted dock catalog 200-A may be used to block or unsupported old dock types and/or firmware versions.

Trusted dock catalog 200-A includes a dock identifier 205, a firmware version 210, and a table index 215. Dock identifier 205 may be a unique identifier, such as a globally unique identifier associated with a dock, also referred to as a docking station. Dock identifier 205 may also be a unique identifier for each specific "kind" of docking station, such as for each docking station model. For example, dock identifier 205 may include a specific number of digits that includes a numeric or alphanumeric code. Firmware version 210 may identify the current firmware version associated with the dock identifier. For example, table index 215 may be used to address a dock hash table 200-B. In a particular example, a row 240 may show a mapping of a dock identifier value 0x9876 with a firmware version value of 1.0 to a table index value of one. Trusted dock catalog 200-A may be stored in a non-volatile memory or data store accessible by information handling system 135, such as cloud data center 185.

FIG. 2B illustrates a portion of a trusted dock hash table 200-B, according to an embodiment of the present disclosure. Trusted dock hash table 200-B, includes table index 215, a firmware block index 220, a starting address 225, a size 230, and a hash 235. A firmware is typically stored in one or more physical blocks of memory, also referred to as firmware blocks. Each firmware block may start at a particular address in a non-volatile memory and span a particular size. The size may specify how many bytes of data should be read from the starting address.

Firmware block index 220 may indicate an index of the firmware block relative to the other blocks in the memory. For example, if the firmware is stored in four memory blocks then firmware block index 220 would be numbered from one through four. Each firmware block index is associated with starting address 225. Starting address 225 may indicate a pointer to a starting address of the firmware block identified in firmware block index 220. The size of the firmware block may be identified by size 230. Hash 235 includes a hash value associated with each firmware block.

Thus, table index 215 may show information associated with firmware blocks of a firmware version and dock type pair. For example, firmware version 1.0 of dock identifier 0x9876 is associated with a table index of one and includes a plurality of firmware blocks that further include firmware block index one through n. In this example, when a request for hash values associated with a dock identifier value of 09x876 and a firmware version value of one is requested, entries associated with a set of rows 250 may be returned as part of a response.

FIG. 3 illustrates a flow chart of a method 300 for provisioning a firmware associated with a dock, according to an embodiment of the present disclosure. Method 300 may be performed by a build server during the manufacture of device 150 and/or information handling system 135 of FIG. 1. However, it should be recognized that other components may be utilized to perform the described method. One of skill in the art will appreciate that this flow chart explains a typical example, which can be extended to applications or services in practice. It will be readily appreciated that not every method step set forth in this flow diagram is always necessary and that certain steps of the methods may be combined, performed simultaneously, in a different order, or perhaps omitted, without varying from the scope of the disclosure.

Method 300 typically starts at block 305 where a trusted dock catalog table and a dock hash table may be created at a build server. The trusted dock catalog and dock hash table may be generated by an ITDM of a distributed system associated with a docking station. In another embodiment, the dock catalog and dock hash table may be generated by the OEM of the docking station. As such the build server along with the trusted dock may be managed and/or controlled by the ITDM and/or the OEM. The method may proceed to 310. At block 310 the build server may sign the dock catalog table and dock hash table using a private key. The private key may be stored in a secure location, such as a hardware security module or similar, by the ITDM and/or the OEM.

The method proceeds to block 315 where the signed dock catalog table and the dock hash table may be securely stored in a cloud data center associated with a manufacturer of a dock also referred to as a docking station. This would allow an authentication service to retrieve a hash value associated with the firmware of a dock for verification during pre-provisioning and/or pre-authorization of the dock. The dock catalog table and the dock hash table may be signed using a private key. At block 320, a public key associated with the private key may be stored and/or provisioned at an embedded controller of a client computing device, such as information handling system 135 of FIG. 1. The public key may be used to validate the signed entries received from the dock hash table. The public key may be stored in the embedded controller during the manufacture of the dock, such as device 150 of FIG. 1.

Figure 4:
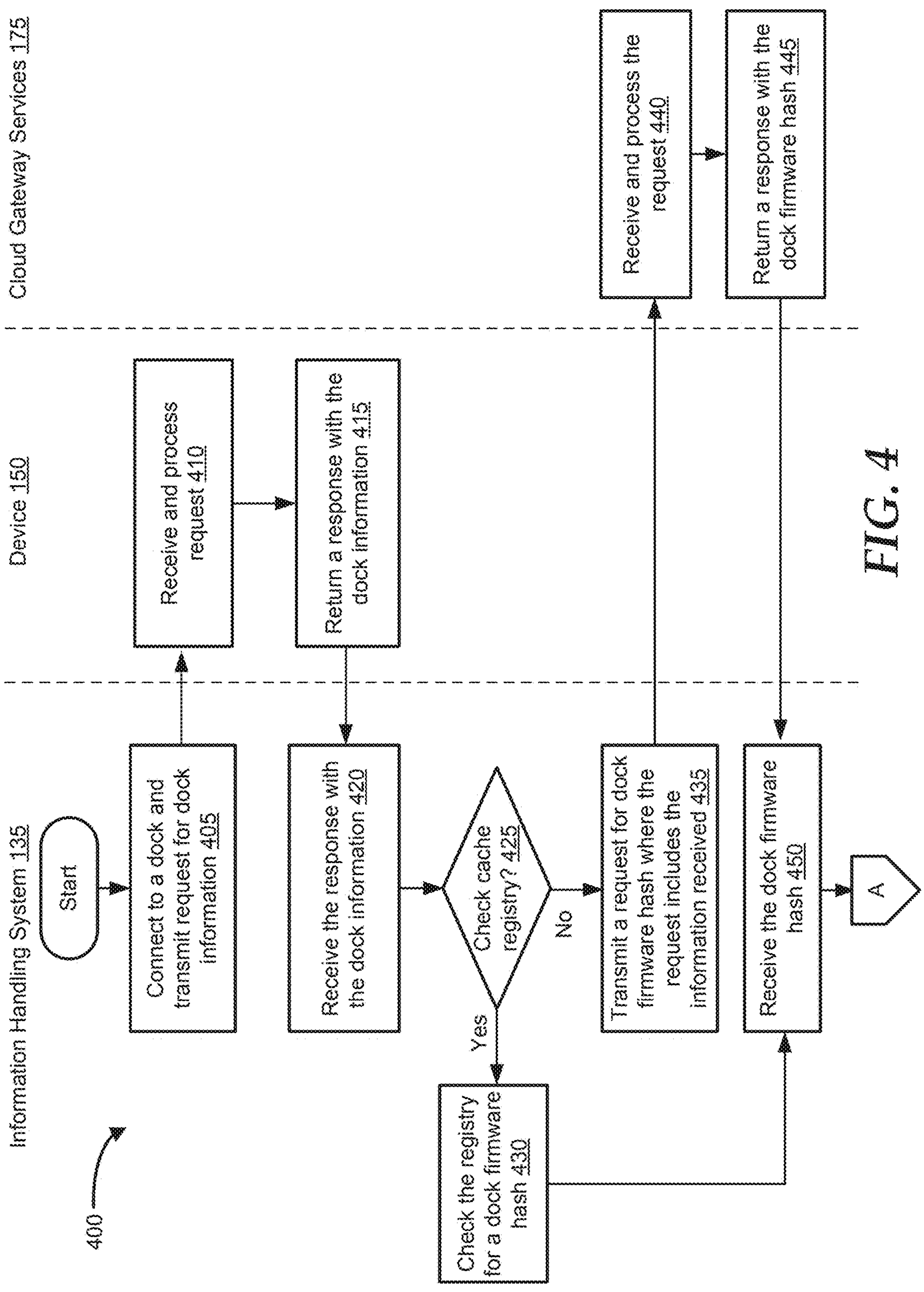
FIGS. 4 and 5 are flow charts of a method for dock verification, according to an embodiment of the present disclosure.

FIG. 4 shows a flow chart of a method 400 for dock verification, according to an embodiment of the present disclosure. The dock verification is performed to determine whether there is a firmware level tampering done to a dock's firmware. A successful verification may provide a level of trust prior to offloading and/or execution of workload at the dock. The dock verification may be performed in response to a connection event between an information handling system and the dock.

Method 400 may be performed by one or more components of distributed system environment 100 of FIG. 1. For example, portions of method 400 may be performed by information handling system 135, device 150, and cloud gateway services 175 of FIG. 1. However, while embodiments of the present disclosure are described in terms of the distributed system environment of FIG. 1, it should be recognized that other components may be utilized to perform the described method. One of skill in the art will appreciate that this flow chart explains a typical example, which can be extended to applications or services in practice. It will be readily appreciated that not every method step set forth in this flow diagram is always necessary and that certain steps of the methods may be combined, performed simultaneously, in a different order, or perhaps omitted, without varying from the scope of the disclosure.

Method 400 typically starts at block 405 when information handling system 135 connects to a dock, such as device 150. At this point, an embedded controller of information handling system 135 may transmit a request for information from device 150 via a sideband interface. The request may be transmitted in response to detecting the connection. The requested information may include a dock identifier, firmware version, and serial number of device 150. The embedded controller of information handling system 135 may be similar to BMC 690 of FIG. 6. The method may proceed to block 410. At block 410, an embedded controller of device 150 may receive and process the request from information handling system 135. The embedded controller of device 150 may transmit a response to the request at block 415. The response includes the dock identifier, firmware version, and a serial number of device 150. The dock identifier may be a vendor identifier and/or a product identifier (PID). The method may proceed to block 420.

At block 420, the embedded controller of the information handling system may receive the response from the embedded controller of device 150. The method may proceed to decision block 425 where the embedded controller may determine whether to check a cache storage or transmit a request to cloud gateway services 175 for a dock firmware hash. The cache registry may be maintained by the embedded controller. For example, if information handling system 135 connected to device 150 or a device that is similar to device 150 before, the cache storage may have one or more entries associated with the dock firmware hash of device 150. Device 150 and the device may be similar if both devices are the same specific kind of device and have the same firmware version. For example, when both devices are docks of a specific type and/or model, both devices may have the same device identifier.

As such, if information handling system 135 connected to a first device with a first device identifier and firmware version prior to connected to device 150, and wherein device 150 is also associated with the first device identifier and firmware version, then the information stored in the cache registry for the first device may be utilized when connecting to device 150. The embedded controller may maintain a flag that indicates whether device 150 or similar has been pre-provisioned and pre-authorized before. If the embedded controller determines to check the cache registry, then the "YES" branch is taken, and the method proceeds to block 430. If the embedded controller determines to not check the cache registry, then the "NO" branch is taken, and the method proceeds to block 435.

At block 430, the embedded controller of information handling system 135 may query the cache storage for the dock firmware hash of device 150. The query may include information associated with device 150, such as the dock identifier, firmware version, and/or serial number of device 150. The cache storage may have a replica of a portion of tables 200-A and 200-B which includes data associated with the docks that information handling system 135 connected to and/or trusted before. For example, the embedded controller may determine a table index associated with the dock identifier and firmware version of device 150 using a replica of a trusted dock catalog that is similar to table 200-A of FIG. 2A. The embedded controller may then determine hash values associated with the table index using a dock hash table similar to table 200-B of FIG. 2B. The method proceeds to block 450.

At block 435, the embedded controller of information handling system 135 may transmit a request for the dock firmware hash associated with device 150 to cloud gateway services 175 via a firmware management service and/or a control plane. The request includes the information associated with device 150, such as the dock identifier, firmware version, and/or serial number of device 150. At block 440, cloud gateway services 175 may receive and process the request from information handling system 135. For example, cloud gateway services 175 may determine a table index associated with the dock identifier and firmware version using a trusted dock catalog, such as table 200-A of FIG. 2A. Cloud gateway services 175 may then determine hash values associated with the table index using a dock hash table, such as table 200-B of FIG. 2B. For example, if the dock identifier of device 150 is 0x987 with a firmware version of 1.00, then the table index maps to "1" based on table 200-A of FIG. 2A. Then, cloud gateway services 175 may proceed to query table 200-B of FIG. 2B to determine entries associated with the table index value of "1." In this example, cloud gateway services 175 may proceed to identify entries associated with table index "1," such as a set of rows 250.

At block 445, cloud gateway services 175 may proceed to respond to the request, wherein the response includes, the entries associated with the table index value that was identified in block 430. For example, cloud gateway services 175 may include hash values Hash-1 through Hash-n of set of rows 250 of table 200-B of FIG. 2B in the response. The dock firmware hash may comprise the hash values. In this example, the dock firmware hash associated with device 150 includes Hash-1 through Hash-n of set of rows 250 of FIG. 2B. The hash values may be encrypted using a private key. In addition to the dock firmware hash, the response may include information associated with each of the hash values, such as a firmware block index with its starting address and size. At block 450, information handling system 135 may receive the response via the control panel which may pass the hash values along with the other information to the embedded controller via the control plane.

Figure 5:
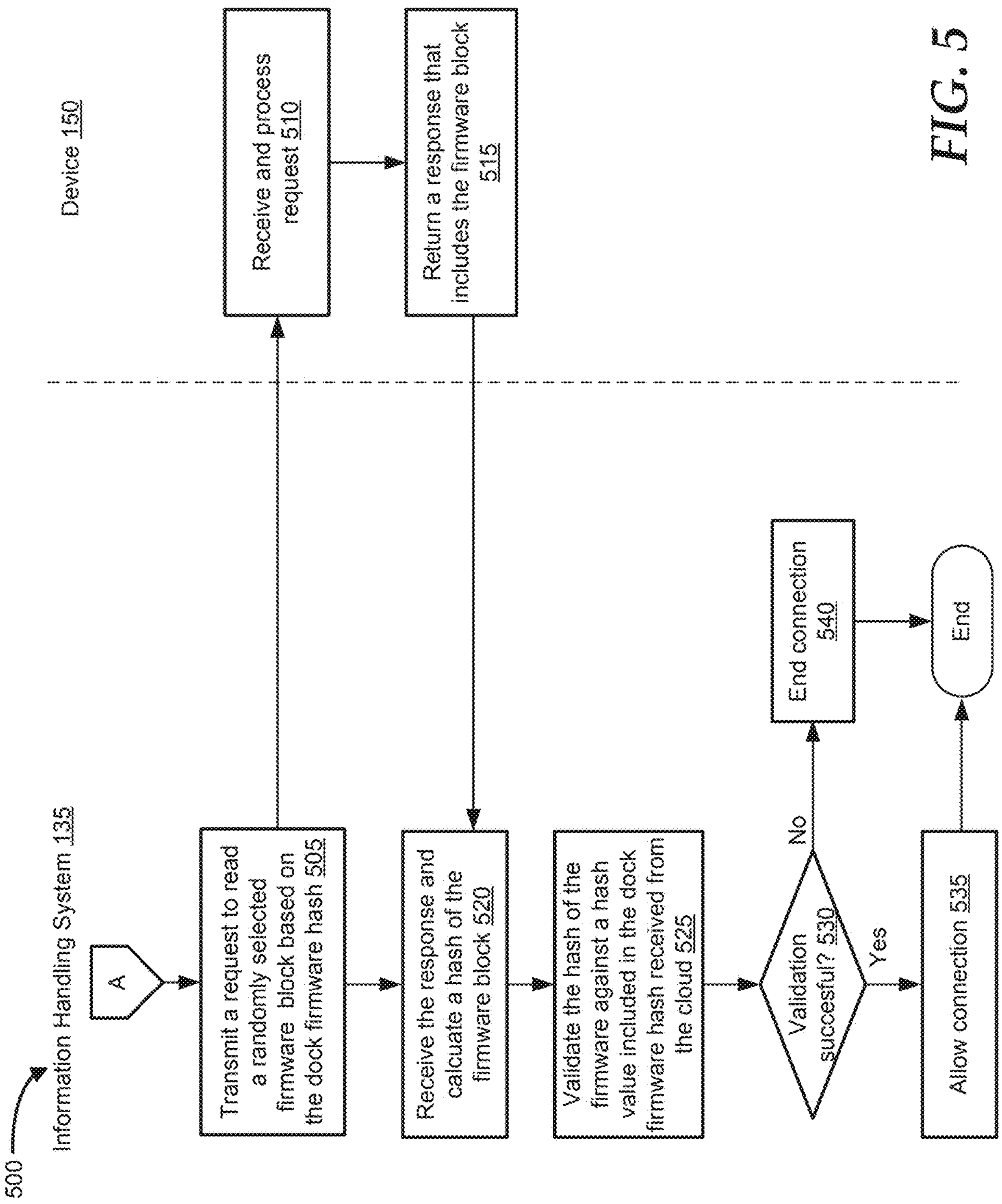

FIG. 5 shows a flowchart of a method 500 which is a continuation of method 400 of FIG. 4. Method 500 typically starts at block 505, where the embedded controller of information handling system 135 may provide the hash values that comprise the dock firmware hash to an authentication service of information handling system 135, such as authentication service 117 of FIG. 1. The authentication service may communicate with device 150 via a firmware management service, such as firmware management service 116. The firmware management service may transmit the request to FW/SW management services 152 of device 150 via a sideband channel to read a firmware or a portion thereof stored in memory. The request may include a randomly selected firmware block index along with its starting address and size from one of the entries with the hash values received. In one example, the authentication service may choose and request to read firmware block index 1 with a starting address of 0xC000, a size of 4K, and a hash value of "Hash-1."

At block 510, device 150 may receive and process the request. For example, a firmware management service installed in the embedded controller of device 150 may read the firmware block associated with the firmware block index from the starting address with the size requested by the authentication service. At block 515, the firmware management service of device 150 may transmit a response to the authentication service via the firmware management service of information handling system 135. The response may include firmware associated with the requested firmware block.

At block 520, the authentication service of information handling system 135 may receive the response via the firmware management service. The authentication service may generate or calculate a hash of the received firmware using an agreed-upon hash function. The method may proceed to block 525, where the authentication service may verify or authenticate the generated/calculated hash with the hash value received from cloud gateway services 175. For example, the authentication service may compare the generated or calculated hash value with the hash value that was received from cloud gateway services 175. The method may proceed to decision block 530.

At decision block 530, the authentication service may determine whether the verification is successful. The verification may be successful when the generated hash value matches the hash value associated with the randomly selected firmware block index received from cloud gateway services 175. For example, the authentication service may determine whether the generated or calculated hash value matches the hash value "Hash-1." If the validation or verification is successful, then the "YES" branch is taken, and the method proceeds to block 535. If the validation or verification is not successful, then the "NO" branch is taken, and the method proceeds to block 540.

At block 535, the connection between the information handling system 135 and device 150 is allowed and device 150 is trusted by information handling system 135. Accordingly, the workload may be offloaded to device 150 for execution. Afterwards, the method ends. At block 540, the connection between information handling system 135 and device 150 is terminated. Accordingly, device 150 may not be trusted. Afterwards, the method ends.

Although certain portions of blocks of method 400 and method 500 are shown to be executed by an embedded controller, one of skill in the art will appreciate that these portions of the blocks may be executed by a CPU, GPU, NPU, or the like similar to the authentication service and/or firmware management services of the information handling system.

FIG. 6 illustrates an embodiment of an information handling system 600 including processors 602 and 604, a chipset 610, a memory 620, a graphics adapter 630 connected to a video display 634, a non-volatile RAM (NVRAM) 640 that includes a basic input and output system/extensible firmware interface (BIOS/EFI) module 642, a disk controller 650, a hard disk drive (HDD) 654, an optical disk drive 656, a disk emulator 660 connected to a solid-state drive (SSD) 664, an input/output (I/O) interface 670 connected to an add-on resource 674 and a trusted platform module (TPM) 676, a network interface 680, and a baseboard management controller (BMC) 690. Processor 602 is connected to chipset 610 via processor interface 606, and processor 604 is connected to the chipset via processor interface 608. In a particular embodiment, processors 602 and 604 are connected together via a high-capacity coherent fabric, such as a HyperTransport link, a QuickPath Interconnect, or the like. Chipset 610 represents an integrated circuit or group of integrated circuits that manage the data flow between processors 602 and 604 and the other elements of information handling system 600. In a particular embodiment, chipset 610 represents a pair of integrated circuits, such as a northbridge component and a southbridge component. In another embodiment, some or all of the functions and features of chipset 610 are integrated with one or more of processors 602 and 604.

Memory 620 is connected to chipset 610 via a memory interface 622. An example of memory interface 622 includes a Double Data Rate (DDR) memory channel and memory 620 represents one or more DDR Dual In-Line Memory Modules (DIMMs). In a particular embodiment, memory interface 622 represents two or more DDR channels. In another embodiment, one or more of processors 602 and 604 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 620 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 630 is connected to chipset 610 via a graphics interface 632 and provides a video display output 636 to a video display 634. An example of a graphics interface 632 includes a Peripheral Component Interconnect-Express (PCIe) interface and graphics adapter 630 can include a four-lane (×4) PCIe adapter, an eight-lane (×8) PCIe adapter, a 16-lane (×16) PCIe adapter, or another configuration, as needed or desired. In a particular embodiment, graphics adapter 630 is provided down on a system printed circuit board (PCB). Video display output 636 can include a Digital Video Interface (DVI), a High-Definition Multimedia Interface (HDMI), a DisplayPort interface, or the like, and video display 634 can include a monitor, a smart television, an embedded display such as a laptop computer display, or the like.

NVRAM 640, disk controller 650, and I/O interface 670 are connected to chipset 610 via an I/O channel 612. An example of I/O channel 612 includes one or more point-to-point PCIe links between chipset 610 and each of NVRAM 640, disk controller 650, and I/O interface 670. Chipset 610 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface, a Universal Serial Bus (USB), another interface, or a combination thereof. NVRAM 640 includes BIOS/EFI module 642 that stores machine-executable code (BIOS/EFI code) that operates to detect the resources of information handling system 600, to provide drivers for the resources, to initialize the resources, and to provide common access mechanisms for the resources. The functions and features of BIOS/EFI module 642 will be further described below.

Disk controller 650 includes a disk interface 652 that connects the disc controller to a hard disk drive (HDD) 654, to an optical disk drive (ODD) 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an institute of electrical and electronics engineers (IEEE) 1394 (Firewire) interface, a proprietary interface, or a combination thereof. Alternatively, SSD 664 can be disposed within information handling system 600.

I/O interface 670 includes a peripheral interface 672 that connects the I/O interface to add-on resource 674, to TPM 676, and to network interface 680. Peripheral interface 672 can be the same type of interface as I/O channel 612 or can be a different type of interface. As such, I/O interface 670 extends the capacity of I/O channel 612 when peripheral interface 672 and the I/O channel are of the same type, and the I/O interface translates information from a format suitable to the I/O channel to a format suitable to the peripheral interface 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on a separate circuit board, or add-in card disposed within information handling system 600, a device that is external to the information handling system, or a combination thereof.

Network interface 680 represents a network communication device disposed within information handling system 600, on a main circuit board of the information handling system, integrated onto another component such as chipset 610, in another suitable location, or a combination thereof. Network interface 680 includes a network channel 682 that provides an interface to devices that are external to information handling system 600. In a particular embodiment, network channel 682 is of a different type than peripheral interface 672 and network interface 680 translates information from a format suitable to the peripheral channel to a format suitable to external devices.

In a particular embodiment, network interface 680 includes a NIC or host bus adapter (HBA), and an example of network channel 682 includes an InfiniBand channel, a Fibre Channel, a Gigabit Ethernet channel, a proprietary channel architecture, or a combination thereof. In another embodiment, network interface 680 includes a wireless communication interface, and network channel 682 includes a Wi-Fi channel, a near-field communication (NFC) channel, a Bluetooth® or Bluetooth-Low-Energy (BLE) channel, a cellular-based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 682 can be connected to an external network resource (not illustrated). The network resource can include another information handling system, a data storage system, another network, a grid management system, another suitable resource, or a combination thereof.

BMC 690 is connected to multiple elements of information handling system 600 via one or more management interface 692 to provide out-of-band monitoring, maintenance, and control of the elements of the information handling system. As such, BMC 690 represents a processing device different from processor 602 and processor 604, which provides various management functions for information handling system 600. For example, BMC 690 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 690 can vary considerably based on the type of information handling system. BMC 690 can operate in accordance with an Intelligent Platform Management Interface (IPMI). Examples of BMC 690 include an Integrated Dell® Remote Access Controller (IDRAC).

Management interface 692 represents one or more out-of-band communication interfaces between BMC 690 and the elements of information handling system 600 and can include an Inter-Integrated Circuit ($I^2C$) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 600, that is apart from the execution of code by processors 602 and 604 and procedures that are implemented on the information handling system in response to the executed code.

BMC 690 operates to monitor and maintain system firmware, such as code stored in BIOS/EFI module 642, option ROMs for graphics adapter 630, disk controller 650, add-on resource 674, network interface 680, or other elements of information handling system 600, as needed or desired. In particular, BMC 690 includes a network interface 694 that can be connected to a remote management system to receive firmware updates, as needed or desired. Here, BMC 690 receives the firmware updates, stores the updates to a data storage device associated with the BMC, and transfers the firmware updates to the NVRAM of the device or system that is the subject of the firmware update, thereby replacing the currently operating firmware associated with the device or system, and reboots information handling system, whereupon the device or system utilizes the updated firmware image.

BMC 690 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 690, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 690 is included on a main circuit board (such as a baseboard, a motherboard, or any combination thereof) of information handling system 600 or is integrated into another element of the information handling system such as chipset 610, or another suitable element, as needed or desired. As such, BMC 690 can be part of an integrated circuit or a chipset within information handling system 600. An example of BMC 690 includes an iDRAC, or the like. BMC 690 may operate on a separate power plane from other resources in information handling system 600. Thus, BMC 690 can communicate with the management system via network interface 694 while the resources of information handling system 600 are powered off. Information can be sent from the management system to BMC 690 and the information can be stored in a RAM or NVRAM associated with the BMC. Information stored in the RAM may be lost after power-down of the power plane for BMC 690, while information stored in the NVRAM may be saved through a power-down/power-up cycle of the power plane for the BMC.

Information handling system 600 can include additional components and additional buses, not shown for clarity. For example, information handling system 600 can include multiple processor cores, audio devices, and the like. While a particular arrangement of bus technologies and interconnections is illustrated for the purpose of example, one of skill will appreciate that the techniques disclosed herein are applicable to other system architectures. Information handling system 600 can include multiple central processing units (CPUs) and redundant bus controllers. One or more components can be integrated together. Information handling system 600 can include additional buses and bus protocols, for example, $I^2C$ and the like. Additional components of information handling system 600 can include one or more storage devices that can store machine-executable code, one or more communications ports for communicating with external devices, and various input and output (I/O) devices, such as a keyboard, a mouse, and a video display.

For purposes of this disclosure information handling system 600 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 600 can include processing resources for executing machine-executable code, such as processor 602, a programmable logic array (PLA), an embedded device such as a System-on-a-Chip (SoC), or other control logic hardware. Information handling system 600 can also include one or more computer-readable media for storing machine-executable code, such as software or data.

Although FIG. 3, FIG. 4, and FIG. 5 show example blocks of method 300, method 400, and method 500 in some implementations, method 300, method 400, and method 500 may include additional blocks, fewer blocks, different blocks, or differently arranged blocks than those depicted in FIG. 3, FIG. 4, and FIG. 5. Those skilled in the art will understand that the principles presented herein may be implemented in any suitably arranged processing system. Additionally, or alternatively, two or more of the blocks of method 300, method 400, and method 500 may be performed in parallel. For example, blocks 315 and 320 of method 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded in a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that causes a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:

retrieving, by an information handling system, dock information in response to detecting a connection between the information handling system and a docking station, wherein the dock information includes a dock identifier and a firmware version;

transmitting a first request for dock firmware based on the dock information subsequent to the detecting of the connection between the information handling system and the docking station;

transmitting a second request to the docking station to read a firmware block associated with the dock firmware received in response to the first request;

generating a hash based on the firmware block received in response to the second request; and verifying the hash by comparing the hash with a hash value included in the dock firmware.

2. The method of claim 1 wherein when the verifying of the hash with the hash value is successful, proceeding with the connection.

3. The method of claim 1, wherein the docking station is trusted when the verifying of the hash with the hash value is successful.

4. The method of claim 3, wherein a workload is offloaded to the docking station subsequent to the docking station being trusted.

5. The method of claim 1, when the verifying of the hash with the hash value is unsuccessful, disconnecting the connection.

6. The method of claim 1, wherein the first request is transmitted to a cloud service.

7. The method of claim 1, wherein the retrieving of the dock information is performed using a sideband interface.

8. The method of claim 1, further comprising: determining whether to check a cache storage or transmit the first request.

9. An information handling system, comprising:

a processor; and a memory coupled to the processor, the memory having program instructions stored thereon that upon execution cause the processor to:

retrieve dock information in response to detecting a connection between the information handling system and a docking station, wherein the dock information includes a dock identifier and a firmware version;

transmit a first request for a dock firmware based on the dock information;

transmit a second request to the docking station to read a firmware block associated with the dock firmware;

generate a hash based on the firmware block received in response to the second request; and verify the hash by comparing the hash with a hash value included in the dock firmware.

10. The information handling system of claim 9, wherein the execution of the program instructions causes the processor further to proceed with the connection when a verification of the hash is successful.

11. The information handling system of claim 9, wherein the docking station is trusted when the verifying of the hash with the hash value is successful.

12. The information handling system of claim 11, wherein a workload is offloaded to the docking station subsequent to the docking station being trusted.

13. The information handling system of claim 9, wherein the execution of the program instructions causes the processor further to disconnect the connection when verification of the hash is unsuccessful.

14. The information handling system of claim 9, wherein the first request is transmitted to a cloud service.

15. The information handling system of claim 9, wherein the first request for the dock information is performed using a sideband interface.

16. A non-transitory computer-readable medium to store instructions that are executable to perform operations comprising:

retrieving dock information in response to detecting a connection between an information handling system and a docking station, wherein the dock information includes a dock identifier and a firmware version;

transmitting a first request for a dock firmware based on the dock information;

transmitting a second request to the docking station to read a firmware block associated with the dock firmware;

generating a hash based on the firmware block received in response to the second request; and verifying the hash by comparing the hash with a hash value included in the dock firmware.

17. The non-transitory computer-readable medium of claim 16, when the verifying of the hash is successful, proceeding with the connection.

18. The non-transitory computer-readable medium of claim 16, wherein the docking station is identified as trusted when the verifying of the hash is successful.

19. The non-transitory computer-readable medium of claim 18, wherein a workload is offloaded to the docking station subsequent to the docking station being trusted.

20. The non-transitory computer-readable medium of claim 16, wherein the operations further comprise disconnecting the connection between the information handling system and the docking station when the verifying of the hash is unsuccessful.

* * * * *